United States Patent

Maier et al.

[11] 3,955,674
[45] May 11, 1976

[54] MAGAZINE FOR A FASTENING ELEMENT SETTING GUN

[75] Inventors: Elmar Maier, Feldkirch-Tisis, Austria; Robert Tilg, Schaan, Liechtenstein

[73] Assignee: Hilti Aktiengesellschaft, Liechtenstein

[22] Filed: Dec. 10, 1974

[21] Appl. No.: 531,439

[30] Foreign Application Priority Data

Dec. 17, 1973  Germany............................ 7344665

[52] U.S. Cl.................................. 206/347; 85/10 E
[51] Int. Cl.²..................... B65D 85/24; F16B 15/00
[58] Field of Search ............ 206/347, 346, 345, 343

[56] References Cited
UNITED STATES PATENTS

| | | | |
|---|---|---|---|
| 226,818 | 4/1880 | Woodward et al. | 206/347 X |
| 2,784,405 | 3/1957 | Working, Jr. | 206/346 |
| 3,294,303 | 12/1966 | Anstett | 206/343 X |
| 3,779,373 | 12/1973 | Maier | 206/346 |
| 3,828,925 | 8/1974 | Magyar et al. | 206/347 |

*Primary Examiner*—Leonard Summer
*Attorney, Agent, or Firm*—Toren, McGeady and Stanger

[57] ABSTRACT

A magazine supporting nail-like fastening elements for use in an explosive charge driven setting gun is formed of an elongated strip having spaced first openings which hold the fastening elements. Concentric with and spaced radially outwardly from each first opening is a ring-like arrangement of arcuate slots or second openings spaced apart by radially extending webs. The webs have reduced thickness portions as compared to the thickness of the strip, so that a weakened region is formed for separation of that portion of the strip radially inwardly of the second openings when a fastening element is driven through the magazine into a receiving material.

6 Claims, 1 Drawing Figure

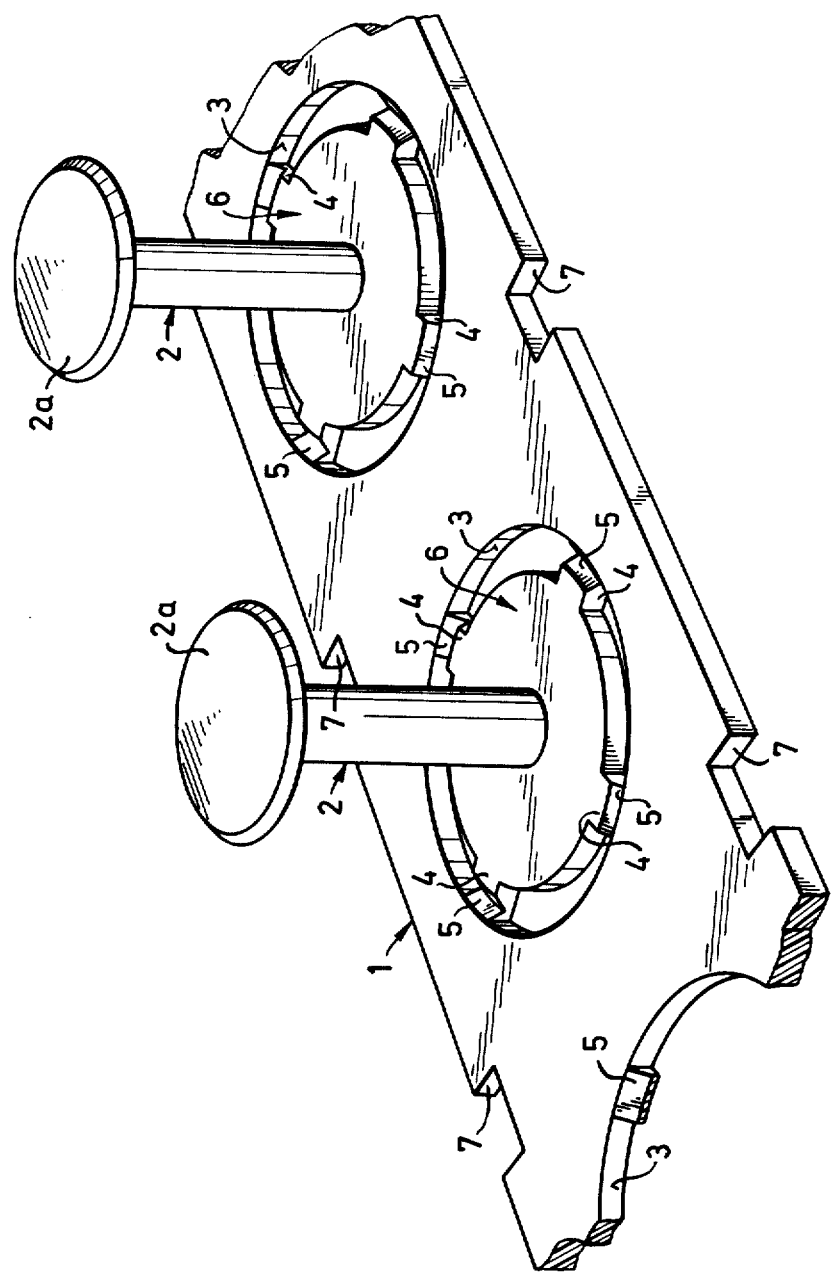

MAGAZINE FOR A FASTENING ELEMENT SETTING GUN

SUMMARY OF THE INVENTION

The present invention concerns a magazine holding nail-like fastening elements for use in a explosive charge driven setting gun and, more particularly, is directed to a magazine formed as an elongated flat strip with a ring-like arrangement of openings around each fastening element with webs spacing the openings apart and with the webs shaped to provide positive separation of that portion of the strip inwardly of the ring-like arrangement of openings when a fastening element is driven through the strip into a receiving material.

There have been known magazines formed of an elongated flat strip with openings disposed concentrically about and spaced radially outwardly from the fastening elements. Webs extend radially between the openings with the combination of the openings and the webs forming a circular path around the fastening elements. When a nail-like fastening element held in the magazine is propelled into a receiving material by an explosive charge driven setting gun, the webs must separate so that the portion of the strip inwardly of the openings and laterally surrounding the fastening elements is broken away from the strip providing a disc-like member which remains on the fastening element.

In such known magazines, particularly in those where the radial distance of the openings outwardly from the fastening element considerably exceeds the radius of the head on the nail-like fastening element, it has been found that the webs do not always separate completely. It has been increasingly noted in the use of such magazines that an irregular separation occurs. As a result, the disc-like portions formed by the strip are bent during the driving operation and are no longer suitable for their intended use in providing a fastening on the receiving material. It is particularly disadvantageous that the unsuitability of the fastening is noticed only after the driving in operation is completed.

Therefore, the present invention is directed to the formation of a magazine where there is a complete and effective separation of the disc-like portions of the strip encircling the fastening elements under all conditions.

In accordance with the present invention the problem is overcome by providing at least a portion of the webs connecting the disc-like portion to the remainder of the strip with a reduced thickness as compared to the thickness of the strip.

The reduced thickness of the web, which results in a weakening of the material, ensures under any circumstances a reliable separation of the disc-like portion of the strip at the point of reduced thickness. To the extent that the thickness of the web is reduced, it is possible to vary in a simple manner the force required for effective separation and to adapt it to the conditions experienced in inserting fastening elements. As a result, if the receiving material into which the fastening element is to be driven has a low strength it requires a greater reduction in the thickness in the webs, since a weaker propellant or explosive charge is used with such receiving material and there is less driving force available for effecting the separation of the disc-like portion from the remainder of the strip.

In a preferred embodiment, the weakened portions are provided by formed notches in the webs. These notches can be produced with a minimum of tools. Moreover, the notches provide a simple arrangement for adapting the reduced thickness portion of the web to the separating force provided as the fastening element is driven into the receiving material.

Preferably, the notches in combination with the openings in the strip are arranged on a circular path concentric to and spaced radially outwardly from the position of the fastening element within the strip. With such an arrangement it is possible to obtain an axially symmetrical form for the disc-like portions which are separated from the remainder of the strip, and such a symmetrical arrangement is particularly desirable from an application point of view. To provide a circular washer-like form to the disc-like portions it is preferable if the openings are in the form of arcuate, narrow slots concentrically surrounding the position of the fastening element.

For feeding the magazine through a setting gun, the lateral edges of the strip are provided with recesses into which the feeding means engage in moving the magazine in a step-wise manner.

The various features of novelty which characterize the invention are pointed out with particularity in the claims annexed to and forming a part of this disclosure. For a better understanding of the invention, its operating advantages and specific objects attained by its use, reference should be has to the accompanying drawings and descriptive matter in which there is illustrated and described a preferred embodiment of the invention.

BRIEF DESCRIPTION OF THE DRAWING

The drawing is a partial perspective view of a magazine embodying the present invention.

DETAILED DESCRIPTION OF THE INVENTION

As illustrated in the drawing, the magazine is formed of an elongated, flat strip 1 with the nail-like fastening elements 2 secured within holes or openings spaced apart in the elongated direction of the strip. Each of the holes in the strip is encircled by a ring-like arrangement of narrow arcuate slot or openings 3 spaced apart by webs 4. The webs 4 extend radially relative to the fastening elements and afford a connection between the portion of the strip radially inwardly of the openings 3 and the remainder of the strip. Each web is provided with a V-shaped notch 5 extending transversely of the radial direction of the web. While a V-shaped notch 5 is illustrated, it can be appreciated that various shapes can be employed for the notches 5. The notches 5 provide a reduced thickness portion in the webs as compared to the thickness of the strip. When a nail-like fastening element 2 is driven through the strip its head 2a contacts the strip radially inwardly from the outer periphery of the openings 3 and causes a disc- or washer-like part 6 to separate from the remainder of the strip at the location of the reduced thickness portions or notches 5 in the webs. The reduced thickness in the webs is especially effective in providing the separation of the part 6 from the remainder of the strip when the diameter of the head 2a is less than the diameter of the part 6.

Along each of the elongated sides of the strip 1, side recesses 7 are provided which engage parts within a setting gun for effecting the feed of the strip so that the fastening elements are aligned within the setting gun for insertion into a receiving material. The setting gun and its parts for feeding the magazine are well known and, therefore, have not been illustrated.

While a specific embodiment of the invention has been shown and described in detail to illustrate the application of the inventive principles, it will be understood that the invention may be embodied otherwise without departing from such principles.

What is claimed is:

1. A magazine for supporting fastening elements for use in an explosive charge driven setting gun comprising a plurality of nail-like headed fastening elements each having a tip end and a headed end, a flat elongated strip having a pair of laterally spaced longitudinally extending edges, said strip having a plurality of first openings therein spaced apart in the elongated direction of the strip and each said first opening arranged to hold one of said fastening elements at a position spaced from the headed end of the fastening element, a plurality of second openings formed in said strip about each said first opening, said second openings being spaced radially outwardly from and extending partly around each said first opening and spaced inwardly from the longitudinally extending edges of said strip, wherein the improvement comprises webs formed in said strip extending radially relative to said first openings and disposed between and separating the adjacent said second openings about each said first opening, at least a portion of each said web having a reduced thickness as compared to the thickness of said strip and the combination of said second openings and the reduced thickness portion of said webs about each said first opening defining a ring-like separation between the portion of said strip located radially inwardly of said second openings and webs and the remainder of the strip so that as one said nail-like fastening element supported within one of said first openings is driven into a receiving material the portion of said strip radially inwardly of said second openings and webs separates and forms a washer-like member on the fastening element.

2. A magazine, as set forth in claim 1, wherein the reduced thickness portion of each said web is formed as a notch extending across the web transversely of the radial direction of the web relative to the first opening with which it is associated.

3. A magazine, as set forth in claim 2, wherein said notch is V-shaped.

4. A magazine, as set forth in claim 2, wherein said notches in said webs extend along a circular path concentric to the first opening with which said webs are associated.

5. A magazine, as set forth in claim 4, wherein said second openings are arcuate slots extending concentrically about said first opening with which they are associated and the radial dimension of said slots relative to the associated first opening is small.

6. A magazine, as set forth in claim 2, wherein the longitudinally extending edges of said strip have spaced recesses therein for feeding the strip through a setting gun.

* * * * *